(12) United States Patent
Okuma et al.

(10) Patent No.: US 11,235,723 B2
(45) Date of Patent: Feb. 1, 2022

(54) VEHICLE SYSTEM

(71) Applicant: HONDA MOTOR CO., LTD., Tokyo (JP)

(72) Inventors: Kenji Okuma, Wako (JP); Hiromi Sato, Wako (JP); Yoshikazu Matsuo, Wako (JP); Seungho Choi, Wako (JP); Yuki Matsuura, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 100 days.

(21) Appl. No.: 16/534,164

(22) Filed: Aug. 7, 2019

(65) Prior Publication Data
US 2020/0047697 A1   Feb. 13, 2020

(30) Foreign Application Priority Data
Aug. 10, 2018 (JP) .............................. JP2018-150966

(51) Int. Cl.
*B60R 21/015* (2006.01)
*B60Q 1/00* (2006.01)

(52) U.S. Cl.
CPC ...... *B60R 21/01538* (2014.10); *B60Q 1/0076* (2013.01); *B60R 2300/8006* (2013.01)

(58) Field of Classification Search
CPC ...... B60R 21/01538; B60R 2300/8006; B60R 16/037; B60R 1/00; B60Q 1/0076
See application file for complete search history.

(56) References Cited

U.S. PATENT DOCUMENTS

| 8,930,072 | B1* | 1/2015 | Lambert | .................. B60R 1/00 701/36 |
| 2016/0082888 | A1 | 3/2016 | Kothari | |
| 2016/0082897 | A1* | 3/2016 | Mouser | ................. H04N 7/183 348/148 |
| 2016/0301842 | A1* | 10/2016 | Intagliata | ........... H04N 5/23222 |
| 2018/0068192 | A1* | 3/2018 | Miller | .................. B60R 25/305 |

FOREIGN PATENT DOCUMENTS

| JP | 2004-363903 A | 12/2004 |
| JP | 2010-201971 A | 9/2010 |
| JP | 2016-149646 A | 8/2016 |
| JP | 2017-171120 A | 9/2017 |

OTHER PUBLICATIONS

Office Action dated Oct. 19, 2021 issued over the corresponding Japanese Patent Application 2018-150966 with the English translation thereof.

* cited by examiner

*Primary Examiner* — Michael J Zanelli
(74) *Attorney, Agent, or Firm* — Carrier Blackman & Associates, P.C.; Joseph P. Carrier; Jeffrey T. Gedeon

(57) ABSTRACT

A vehicle system includes: a camera that can capture an image of a vehicle occupant; and a state change unit that can change an image capturing state for the vehicle occupant by the camera to each of an image capturing permitted state where an image of the vehicle occupant is permitted to be captured and an image capturing limited state where capturing the image of the vehicle occupant is limited. The state change unit changes the image capturing state for each vehicle occupant.

13 Claims, 10 Drawing Sheets

FIG. 3

| CHANGE INSTRUCTION FROM OTHER SEAT | CHANGE INSTRUCTION FROM DRIVER'S SEAT | DETECTION VALUE FROM WEIGHT SENSOR | CHANGE INSTRUCTION TO BE PRIORITIZED |
|---|---|---|---|
| ABSENT | ABSENT | - (REGARDLESS OF DETECTION VALUE) | ABSENT (IMAGE CAPTURING LIMITED STATE) |
| PRESENT | ABSENT | MORE THAN OR EQUAL TO PREDETERMINED VALUE | CHANGE INSTRUCTION FROM OTHER SEAT |
| ABSENT | PRESENT | MORE THAN OR EQUAL TO PREDETERMINED VALUE | CHANGE INSTRUCTION FROM DRIVER'S SEAT |
| PRESENT | PRESENT | MORE THAN OR EQUAL TO PREDETERMINED VALUE | CHANGE INSTRUCTION FROM DRIVER'S SEAT |
| PRESENT | ABSENT | LESS THAN PREDETERMINED VALUE | ABSENT (IMAGE CAPTURING LIMITED STATE) |
| ABSENT | PRESENT | LESS THAN PREDETERMINED VALUE | CHANGE INSTRUCTION FROM DRIVER'S SEAT |
| PRESENT | PRESENT | LESS THAN PREDETERMINED VALUE | CHANGE INSTRUCTION FROM DRIVER'S SEAT |

| 66 | CHANGE INSTRUCTION (70) | LOCK INSTRUCTION (72) |
|---|---|---|
| PRESENCE OR ABSENCE OF SIGNAL | PRESENT OR ABSENT | PRESENT OR ABSENT |
| INSTRUCTION CONTENT | IMAGE CAPTURING PERMITTED STATE OR IMAGE CAPTURING LIMITED STATE | LOCK OR UNLOCK |

FIG. 4B

| 68 | CHANGE INSTRUCTION (70) | LOCK INSTRUCTION (72) |
|---|---|---|
| PRESENCE OR ABSENCE OF SIGNAL | ABSENT | ABSENT |
| INSTRUCTION CONTENT | IMAGE CAPTURING LIMITED STATE | UNLOCK |

FIG. 4C

| 68 | CHANGE INSTRUCTION FROM OTHER SEAT (70) | CHANGE INSTRUCTION FROM DRIVER'S SEAT (70) | LOCK INSTRUCTION FROM DRIVER'S SEAT (72) |
|---|---|---|---|
| PRESENCE OR ABSENCE OF SIGNAL | PRESENT OR ABSENT | PRESENT OR ABSENT | PRESENT OR ABSENT |
| INSTRUCTION CONTENT | IMAGE CAPTURING PERMITTED STATE OR IMAGE CAPTURING LIMITED STATE | IMAGE CAPTURING PERMITTED STATE OR IMAGE CAPTURING LIMITED STATE | LOCK OR UNLOCK |

FIG. 4D

| 68 | CHANGE INSTRUCTION FROM OTHER SEAT (70) | CHANGE INSTRUCTION FROM DRIVER'S SEAT (70) | LOCK INSTRUCTION FROM DRIVER'S SEAT (72) |
|---|---|---|---|
| PRESENCE OR ABSENCE OF SIGNAL | ABSENT | ABSENT | ABSENT |
| INSTRUCTION CONTENT | IMAGE CAPTURING LIMITED STATE | IMAGE CAPTURING LIMITED STATE | UNLOCK |

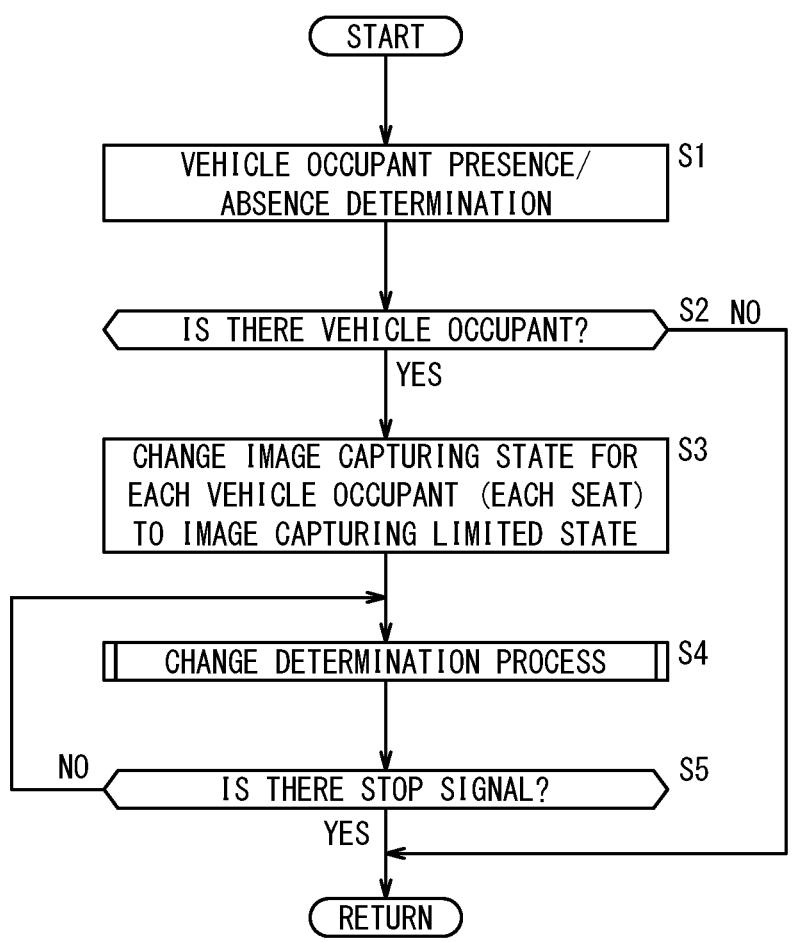

FIG. 10

| FUNCTION INFORMATION | | CONDITION INFORMATION |
|---|---|---|
| FUNCTION NAME | FUNCTION CONTENT | |
| FIRST FUNCTION | A | IMAGE CAPTURING PERMITTED STATE |
| SECOND FUNCTION | B | IMAGE CAPTURING LIMITED STATE |
| THIRD FUNCTION | C | IMAGE CAPTURING STATE FOR ALL VEHICLE OCCUPANTS IS IMAGE CAPTURING PERMITTED STATE |

VEHICLE SYSTEM

CROSS-REFERENCE TO RELATED APPLICATION

This application is based upon and claims the benefit of priority from Japanese Patent Application No. 2018-150966 filed on Aug. 10, 2018, the contents of which are incorporated herein by reference.

BACKGROUND OF THE INVENTION

Field of the Invention

The present invention relates to a vehicle system that captures an image of a vehicle occupant in a vehicle.

Description of the Related Art

There is a vehicle including a camera that captures an image of the inside of the vehicle. In the present specification, the term "camera" refers to a camera that is used for capturing an image of the inside of the vehicle. The camera outputs image information in the vehicle that includes a vehicle occupant. Japanese Laid-Open Patent Publication No. 2017-171120 discloses a device that determines a state of a vehicle occupant on the basis of image information that is output from a camera. This device captures images of all seats (vehicle occupants).

SUMMARY OF THE INVENTION

In recent years, various functions that use image information in a vehicle have been examined. When these functions are performed, the image information that is output by the camera is stored in a recording device inside or outside the vehicle. However, some vehicle occupants do not desire to have their images captured by the camera because of various reasons such as a concern about information leakage. The device in Japanese Laid-Open Patent Publication No. 2017-171120 automatically captures images of all the vehicle occupants in the vehicle. Thus, the will of the vehicle occupant who does not desire image-capturing cannot be reflected.

The present invention has been made in view of the above problem, and an object is to provide a vehicle system that can reflect the will of each vehicle occupant regarding whether to have his/her image captured.

An aspect of the present invention is a vehicle system that captures an image of a vehicle occupant in a vehicle, and the vehicle system includes: a camera configured to capture the image of the vehicle occupant; and a state change unit configured to change an image capturing state for the vehicle occupant by the camera to each of an image capturing permitted state where the image of the vehicle occupant is permitted to be captured and an image capturing limited state where capturing the image of the vehicle occupant is limited, wherein the state change unit is configured to change the image capturing state for each of a plurality of the vehicle occupants.

In the present invention, the image capturing state by the camera can be changed for each vehicle occupant. Thus, the will of each vehicle occupant can be reflected, regarding whether to have his/her image captured.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 3 is a diagram that shows registered content in a priority determination table;

FIG. 4A is a diagram that shows content of driver's seat information, FIG. 4B is a diagram that shows initialized driver's seat information, FIG. 4C is a diagram that shows content of other seat information, and FIG. 4D is a diagram that shows initialized other seat information;

FIG. 5 is a flowchart of a main process performed in the vehicle system;

FIG. 10 is a diagram that shows registered content in a function DB.

DESCRIPTION OF THE PREFERRED EMBODIMENTS

Figure 1:
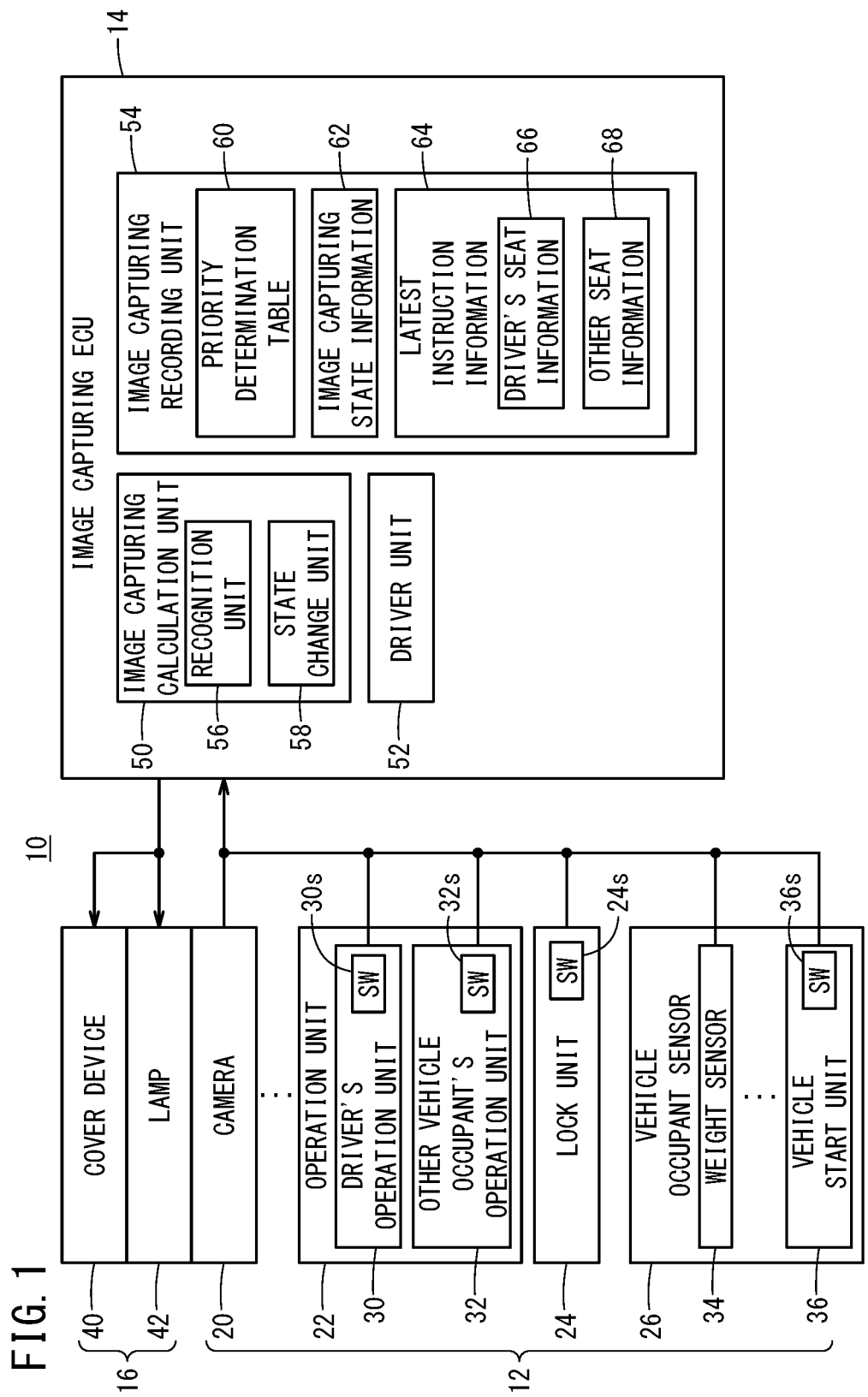
FIG. 1 is a configuration diagram of a vehicle system according to a first embodiment.

Preferred embodiments of a vehicle system according to the present invention are hereinafter described in detail with reference to the attached drawings.

1. First Embodiment

[1.1. Configuration of Vehicle System 10]

A configuration of a vehicle system 10 according to a first embodiment is described with reference to FIG. 1. The vehicle system 10 includes an image capturing ECU 14 that performs various processes regarding image capturing, an input device 12 that gives various pieces of information to the image capturing ECU 14, and an output device 16 that receives an operation instruction from the image capturing ECU 14.

The input device 12 includes a camera 20, an operation unit 22, a lock unit 24, and a vehicle occupant sensor 26. The input device 12 is described with reference to FIG. 1 and FIG. 2. Note that FIG. 2 is a schematic upper view in a vehicle whose fixed number of vehicle occupants is four. In FIG. 2, it is assumed that a driver's seat 90*a* is on a right side in the vehicle.

The camera 20 is individually provided in front of each seat 90 in the vehicle. The position and the posture of the camera 20 are adjusted in advance so that the camera 20 can capture an image of the face of a vehicle occupant who is seated on the seat 90 corresponding to an image capturing target, that is, that the face image of the vehicle occupant can be within an angle of view of the camera 20. The camera 20 can take still images at predetermined time intervals or a moving image. The camera 20 outputs image information of the vehicle occupant to the image capturing ECU 14.

The operation unit 22 is provided to each armrest 92. The vehicle occupant who is seated on the seat 90 that is close to the armrest 92 can operate the operation unit 22. The operation unit 22 may be provided at, instead of the armrest 92, a peripheral position of the seat 90 corresponding to this operation unit 22 (a position where the vehicle occupant who is seated on this seat can operate the operation unit 22). For example, the peripheral position of the driver's seat 90a is a steering wheel, a center console, a dashboard (including instrument panel), a ceiling, or the like. The peripheral position of a passenger seat (other seat 90b) is the center console, the dashboard, the ceiling, or the like. The peripheral position of a rear seat (other seat 90b) is a console box, a seat back of the seat 90 ahead of the rear seat, the ceiling, or the like. Each armrest 92 includes the operation unit 22. The operation unit 22 includes a driver's operation unit 30 or an other vehicle occupant's operation unit 32.

The driver's operation unit 30 is provided to the armrest 92 that is close to the driver's seat 90a. The driver's operation unit 30 includes four driver's seat switches 30s, for example, rocker switches or switches for an alternate action, and a signal output circuit (not shown) that includes the driver's seat switches 30s. The driver's seat switches 30s correspond to the seats 90 (driver's seat 90a and other seats 90b), respectively. The driver's operation unit 30 outputs to the image capturing ECU 14, a change signal in accordance with an operation for the driver's seat switch 30s. The change signal is an ON/OFF signal to change an image capturing state for the vehicle occupant who is seated on the seat 90 corresponding to the driver's seat switch 30s.

The other vehicle occupant's operation unit 32 includes one other seat switch 32s, for example, the rocker switch or the switch for the alternate action, and a signal output circuit (not shown) that includes the other seat switch 32s. The other vehicle occupant's operation unit 32 outputs to the image capturing ECU 14, the change signal in accordance with the operation for the other seat switch 32s. The change signal is the ON/OFF signal to change the image capturing state for the vehicle occupant who is seated on the other seat 90b.

In addition, the lock unit 24 is provided to the armrest 92 that is close to the driver's seat 90a. The lock unit 24 can be operated by the vehicle occupant who is seated on the driver's seat 90a (driver). Similarly to the driver's operation unit 30, the lock unit 24 may be provided at the peripheral position of the driver's seat 90a, for example, the steering wheel, the center console, the dashboard, or the ceiling. The lock unit 24 includes a lock switch 24s, for example, the rocker switch or the switch for the alternate action, and a signal output circuit (not shown) that includes the lock switch 24s. The lock unit 24 outputs to the image capturing ECU 14, a lock signal or an unlock signal in accordance with the operation for the lock switch 24s. The lock signal is a signal to lock the image capturing state for the vehicle occupants who are seated on the driver's seat 90a and the other seat 90b. That is to say, an image capturing limited state cannot be changed to an image capturing permitted state (cannot be changed to other than the image capturing limited state). The unlock signal is a signal to unlock the image capturing state.

The vehicle occupant sensor 26 detects vehicle occupant presence/absence information that expresses whether the vehicle occupant is in the vehicle. As the vehicle occupant sensor 26, a weight sensor 34 is used. The weight sensor 34 is individually provided to a seat cushion of each seat 90. The weight sensor 34 outputs to the image capturing ECU 14, weight information that expresses the weight of the vehicle occupant who is seated on the seat 90. The weight information is used as the vehicle occupant presence/absence information. In addition, as illustrated in FIG. 1, a vehicle start unit 36 may be used as the vehicle occupant sensor 26. The vehicle start unit 36 includes a power switch 36s and a signal output circuit (not shown) that includes the power switch 36s. The vehicle start unit 36 outputs to the image capturing ECU 14, a start signal or a stop signal in accordance with the operation for the power switch 36s. The start signal and the stop signal are used as the vehicle occupant presence/absence information.

The image capturing ECU 14 is an electronic control unit (ECU) that includes an image capturing calculation unit 50, a driver unit 52, an image capturing recording unit 54, an input/output interface (not shown), and the like.

The image capturing calculation unit 50 includes a processor such as a CPU, and achieves various functions when the processor executes programs recorded in the image capturing recording unit 54. In the present embodiment, the image capturing calculation unit 50 functions as a recognition unit 56 and a state change unit 58. The recognition unit 56 recognizes the vehicle occupant by extracting face image information of the vehicle occupant from the image information that is output from each camera 20 and comparing the face image information with information in a face image database (not shown). The recognition unit 56 causes the image capturing recording unit 54 or a recording device (not shown) inside or outside the vehicle to record the image information and a recognition result. The state change unit 58 changes the image capturing state for the vehicle occupant by the camera 20 to one of the image capturing permitted state where image capturing of the vehicle occupant is permitted, and the image capturing limited state where the image capturing of the vehicle occupant is limited. Moreover, the state change unit 58 outputs an instruction signal to the driver unit 52. The process that is performed by the state change unit 58 will be described in detail in the paragraph [1.2.] below.

The driver unit 52 is a circuit that supplies power to the output device 16 or stops the power to the output device 16 in accordance with the instruction signal that is output from the image capturing calculation unit 50 (state change unit 58).

The image capturing recording unit 54 includes a memory such as a ROM and a RAM. The image capturing recording unit 54 stores a priority determination table 60 illustrated in FIG. 3 in advance. Moreover, the image capturing recording unit 54 stores image capturing state information 62 that expresses whether the current image capturing state by each camera 20 is the image capturing permitted state or the image capturing limited state. Furthermore, the image capturing recording unit 54 stores latest instruction information 64. The latest instruction information 64 is updated every time any one of the driver's seat switches 30s, the other seat switch 32s, and the lock switch 24s is operated. The latest instruction information 64 includes driver's seat information 66 illustrated in FIG. 4A and other seat information 68 illustrated in FIG. 4C.

The priority determination table 60 is used to determine which change signal should be used when the image capturing state of the other seat 90b is set. As illustrated in FIG. 3, the priority determination table 60 associates the change signal that should be prioritized (change instruction that should be prioritized) with the combination between the presence or absence of the change signal for the other seat 90b that is output from the other vehicle occupant's operation unit 32 (change instruction from the other seat 90b), the presence or absence of the change signal for the other seat 90b that is output from the driver's operation unit 30 (change instruction from the driver's seat 90a), and a detection value from the weight sensor 34 that is provided to the other seat 90b. If the detection value from the weight sensor 34 of the other seat 90b is more than or equal to a predetermined value, the priority determination table 60 prioritizes the change instruction from the other seat 90b over the change instruction from the driver's seat 90a. Moreover, if the detection value from the weight sensor 34 of the other seat 90b is less than the predetermined value, the priority determination table 60 prioritizes the change instruction from the driver's seat 90a over the change instruction from the other seat 90b. The purpose of this process is to, if the vehicle occupant who is seated on the other seat 90b is a child, prevent the child from operating the other seat switch 32s.

As illustrated in FIG. 4A, the driver's seat information 66 is set in accordance with the driver's seat 90a and expresses the latest instruction state with respect to the image capturing state of the driver's seat 90a. The driver's seat information 66 includes change operation information 70 that expresses the presence or absence and instruction content of the change signal for the driver's seat 90a that is output from the driver's operation unit 30. The instruction content is one of the instruction that changes the image capturing state to the image capturing permitted state and the instruction that changes the image capturing state to the image capturing limited state. In addition, as illustrated in FIG. 4A, the driver's seat information 66 includes lock operation information 72 that expresses the presence or absence and the instruction content of the lock signal or the unlock signal that is output from the lock unit 24. Note that FIG. 4B expresses the driver's seat information 66 in an initialized state.

As illustrated in FIG. 4C, the other seat information 68 is individually set for each other seat 90b and expresses the latest instruction state with respect to the image capturing state of each other seat 90b. The other seat information 68 includes the change operation information 70 that expresses the presence or absence and the instruction content of the change signal for the other seat 90b that is output from the other vehicle occupant's operation unit 32 (change instruction from other seat 90b) and the presence or absence and the instruction content of the change signal for the other seat 90b that is output from the driver's operation unit 30 (change instruction from driver's seat 90a). The instruction content is one of the instruction that changes the image capturing state to the image capturing permitted state and the instruction that changes the image capturing state to the image capturing limited state. In addition, as illustrated in FIG. 4C, the other seat information 68 includes the lock operation information 72 that expresses the presence or absence and the instruction content of the lock signal or the unlock signal that is output from the lock unit 24. Note that FIG. 4D expresses the other seat information 68 in the initialized state.

Figure 2:
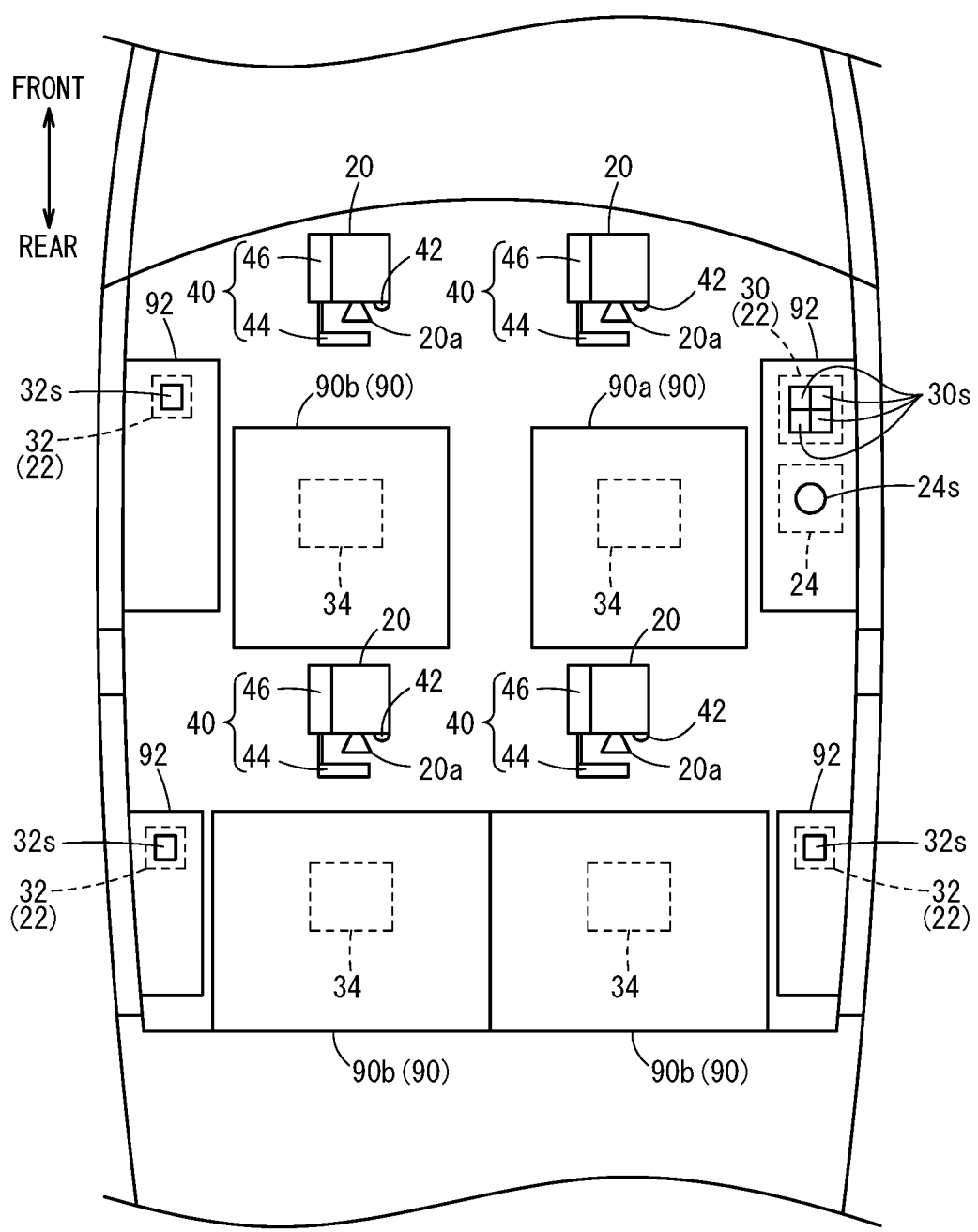
FIG. 2 is an upper view that schematically illustrates the inside of a vehicle.

Back to FIG. 1 and FIG. 2, the output device 16 is described. The output device 16 includes a plurality of cover devices 40 and a plurality of lamps 42.

The cover device 40 is provided to each camera 20, and includes a cover 44 and an operation mechanism 46. The cover 44 can move between a position where a lens 20a of the camera 20 is exposed to the outside (exposure position) and a position where the lens 20a is shaded (shading position). The operation mechanism 46 includes a motor that operates the cover 44, and a link or a gear that connects the motor and the cover 44. The cover device 40 drives the motor with the power that is supplied from the driver unit 52 of the image capturing ECU 14, and changes the position of the cover 44.

The lamp 42 is provided to each camera 20. The lamp 42 is provided at a position that the vehicle occupant can see, for example, a side of the lens 20a. When the power is supplied from the driver unit 52, the lamp 42 becomes a lighting state, and when the power is stopped, the lamp 42 becomes an extinction state. When the camera 20 captures the image of the vehicle occupant, the lamp 42 is turned on, and when the camera 20 does not capture the image of the vehicle occupant, the lamp 42 is turned off.

[1.2. Operation of Vehicle System 10]

[1.2.1. Main Process]

A main process that is performed in the vehicle system 10 is described with reference to FIG. 5. The process to be described below is performed mainly by the state change unit 58.

In step S1, the state change unit 58 determines whether the vehicle occupant is in the vehicle on the basis of the vehicle occupant presence/absence information that is output from the vehicle occupant sensor 26. For example, if the weight information output from any one of the weight sensors 34 changes from the value that is less than a predetermined threshold to the value that is more than or equal to the threshold, the state change unit 58 determines that the vehicle occupant has gotten on the vehicle. If the weight information output from all of the weight sensors 34 is less than the threshold, the state change unit 58 determines that there is no vehicle occupant. Alternatively, if the start signal that is output from the vehicle start unit 36 is detected, the state change unit 58 determines that the vehicle occupant has gotten on the vehicle. If the start signal is not detected, the state change unit 58 determines that there is no vehicle occupant. If the vehicle occupant is in the vehicle (step S2: YES), the process advances to step S3. On the other hand, if the vehicle occupant is not in the vehicle (step S2: NO), the process ends temporarily.

When the process has advanced from step S2 to step S3, the state change unit 58 changes the image capturing state for the vehicle occupant (seat 90) by each camera 20 to the image capturing limited state. In the present embodiment, the state change unit 58 sets the image capturing state to either one of the image capturing permitted state and the image capturing limited state. The image capturing permitted state is a state where the image of the vehicle occupant corresponding to the image capturing target is captured as usual, in other words, the image of the vehicle occupant is captured without limitation. On the other hand, the image capturing limited state is a state where the image capturing is limited to some extent. In the present embodiment, to be described below, the image information itself is not acquired in the image capturing limited state.

In step S3, the state change unit 58 outputs to the driver unit 52, the instruction signal in accordance with the image capturing limited state. The driver unit 52 supplies each cover device 40 with the power to move the cover 44 to the shading position. The driver unit 52 does not supply each lamp 42 with the power. Then, the lens 20a of each camera 20 is covered with the cover 44, and the lamp 42 is in the extinction (light-out) state. Thus, the vehicle occupant who is seated in front of the camera 20 can recognize that the image information is not acquired by the camera 20. As described above, just after the vehicle occupant gets on the vehicle, the image capturing state for all the vehicle occupants is the image capturing limited state. Moreover, the state change unit 58 updates the image capturing state information 62 for each vehicle occupant to information that expresses the image capturing limited state. Furthermore, the state change unit 58 initializes the driver's seat information 66 corresponding to the driver as shown in FIG. 4B, and initializes the other seat information 68 corresponding to the other vehicle occupant as shown in FIG. 4D.

In step S4, a change determination process (FIG. 6) for the image capturing state is performed. In the change determination process, the image capturing state of the vehicle occupant is appropriately changed in accordance with the operation of the operation unit 22. If the state change unit 58 does not detect the stop signal that is output from the vehicle start unit 36 (step S5: NO), the process in step S4 is repeatedly performed at predetermined time intervals. On the other hand, if the state change unit 58 has detected the stop signal that is output from the vehicle start unit 36 (step S5: YES), the process in step S4 ends and the main process ends.

[1.2.2. Updating Latest Instruction Information 64]

Before the change determination process shown in step S4 in FIG. 5 is described in detail, a basic process in accordance with the operation of the driver's seat switches 30s and the other seat switch 32s is described.

[1.2.2A. Updating Driver's Seat Information 66]

The driver operates the driver's seat switches 30s corresponding to the driver's seat 90a and the lock switch 24s at any timing.

If the state change unit 58 has detected the change signal for the driver's seat 90a that is output from the driver's operation unit 30, the state change unit 58 specifies the content (ON or OFF) of the signal. The state change unit 58 updates the change operation information 70 that is included in the driver's seat information 66 on the basis of a specified result.

If the state change unit 58 has detected the lock signal or the unlock signal that is output from the lock unit 24, the state change unit 58 specifies the content (lock or unlock) of the signal. The state change unit 58 updates the lock operation information 72 that is included in the driver's seat information 66 on the basis of the specified result.

[1.2.2B. Updating Other Seat Information 68]

The vehicle occupant operates the other seat switch 32s at any timing. In addition, the driver operates the driver's seat switch 30s corresponding to the other seat 90b and the lock switch 24s at any timing.

If the state change unit 58 has detected the change signal that is output from the other vehicle occupant's operation unit 32, the state change unit 58 specifies the other seat 90b (target seat) corresponding to the other vehicle occupant's operation unit 32 that has output the change signal, and the change content (ON or OFF) of the change signal. The state change unit 58 updates the change operation information 70 that is included in the other seat information 68 of the target seat on the basis of the specified result. In addition, if the state change unit 58 has detected the change signal for the other seat 90b that is output from the driver's operation unit 30, the state change unit 58 specifies the other seat 90b (target seat) and the change content (ON or OFF) of the change signal. The state change unit 58 updates the change operation information 70 that is included in the other seat information 68 of the target seat on the basis of the specified result.

If the state change unit 58 has detected the lock signal or the unlock signal that is output from the lock unit 24, the state change unit 58 specifies the content (lock or unlock) of the signal. The state change unit 58 updates the lock operation information 72 that is included in the other seat information 68 of all of the seats 90 on the basis of the specified result.

[1.2.3. Change Determination Process]

The change determination process shown in step S4 in FIG. 5 is described with reference to FIG. 6. The state change unit 58 performs the process of step S11 (process to be described in [A] below) and the process after step S11 when the driver is in the vehicle. Moreover, the state change unit 58 performs the process of step S11 (process to be described in [B] below) and the process after step S11 for each other vehicle occupant when the vehicle occupant other than the driver is in the vehicle.

In step S11, the state change unit 58 determines whether the change of the image capturing state for the vehicle occupant is necessary. This determination is performed as follows.

[1.2.3A. Case of Driver's Seat 90a]

In step S11, the state change unit 58 compares the instruction content (image capturing permitted state or image capturing limited state) of the driver's seat information 66 shown in FIG. 4A and the image capturing state information 62 of the driver's seat 90a, that is, the current image capturing state. If the instruction content of the driver's seat information 66 is different from the image capturing state information 62 of the driver's seat 90a and the lock operation information 72 expresses the unlock, the state change unit 58 determines that the change of the image capturing state for the driver who is seated on the driver's seat 90a is necessary. On the other hand, if the instruction content of the driver's seat information 66 is the same as the image capturing state information 62 of the driver's seat 90a or the lock operation information 72 expresses the lock, the state change unit 58 determines that the change of the image capturing state for the driver who is seated on the driver's seat 90a is not necessary. Note that even in the case where the lock operation information 72 expresses the lock, in the present embodiment, if the instruction content is different from the image capturing state information 62 of the driver's seat 90a and the image capturing state information 62 is the image capturing permitted state, the state change unit 58 determines that the change of the image capturing state for the vehicle occupant who is seated on the other seat 90b (change from image capturing permitted state to image capturing limited state) is necessary.

[1.2.3B. Case of Other Seat 90b]

In step S11, the state change unit 58 determines a property of the vehicle occupant. In the present embodiment, the property of the vehicle occupant is determined depending on whether the vehicle occupant is an adult or a child. Whether the vehicle occupant is an adult or a child is determined depending on whether the weight of the vehicle occupant is more than or equal to the predetermined value. Here, the state change unit 58 determines whether the detection value from the weight sensor 34 is more than or equal to the predetermined value that is recorded in the image capturing recording unit 54 in advance. Moreover, the state change unit 58 compares this determination result and the other seat information 68 that is shown in FIG. 4C, with the priority determination table 60 shown in FIG. 3, and decides which to prioritize between the instruction from the other seat 90b and the instruction from the driver's seat 90a.

On the basis of a decision result, the state change unit 58 selects either one of the change instruction from the other seat 90b and the change instruction from the driver's seat 90a in the change operation information 70 that is included in the other seat information 68. Moreover, the state change unit 58 compares the instruction content (image capturing permitted state or image capturing limited state) of the selected instruction and the image capturing state information 62 of the other seat 90b, that is, the current image capturing state. If the selected instruction content is different from the image capturing state information 62 of the other seat 90b and the lock operation information 72 expresses the unlock, the state change unit 58 determines that the change of the image capturing state for the vehicle occupant who is seated on the other seat 90b is necessary. On the other hand, if the instruction content is the same as the image capturing state information 62 of the other seat 90b or the lock operation information 72 expresses the lock, the state change unit 58 determines that the change of the image capturing state for the vehicle occupant who is seated on the other seat 90b is not necessary. Note that even in the case where the lock operation information 72 expresses the lock, in the present embodiment, if the instruction content is different from the image capturing state information 62 of the other seat 90b and the image capturing state information 62 is the image capturing permitted state, the state change unit 58 determines that the change of the image capturing state for the vehicle occupant who is seated on the other seat 90b (change from image capturing permitted state to image capturing limited state) is necessary.

As a result of the determination performed in the paragraph [1.2.3A] or [1.2.3B] described above, if the change of the image capturing state is necessary (step S12: YES), the process advances to step S13. In step S13, the state change unit 58 changes the image capturing state. Here, the state change unit 58 generates the instruction signal in accordance with the instruction content that is determined in step S11, and outputs the instruction signal to the driver unit 52. The driver unit 52 supplies the cover device 40 with the power in accordance with the instruction signal. Then, the cover 44 operates so as to expose or shade the lens 20a. Moreover, in accordance with the instruction signal, the driver unit 52 supplies the power to the lamp 42 or stops the power to the lamp 42. Then, the lamp 42 is changed from the lighting state to the extinction state, or from the extinction state to the lighting state. In the image capturing permitted state, the image information of the vehicle occupant acquired by the camera 20 is stored in the image capturing recording unit 54.

On the other hand, as the result of the determination performed in the paragraph [1.2.3A] or [1.2.3B] described above, if the change of the image capturing state is not necessary (step S12: NO), the process advances to step S14. In step S14, the state change unit 58 maintains the image capturing state. At this time, the state change unit 58 does not output the instruction signal to the driver unit 52.

[1.3. Modifications]
[1.3.1. First Modification]

Figure 7:
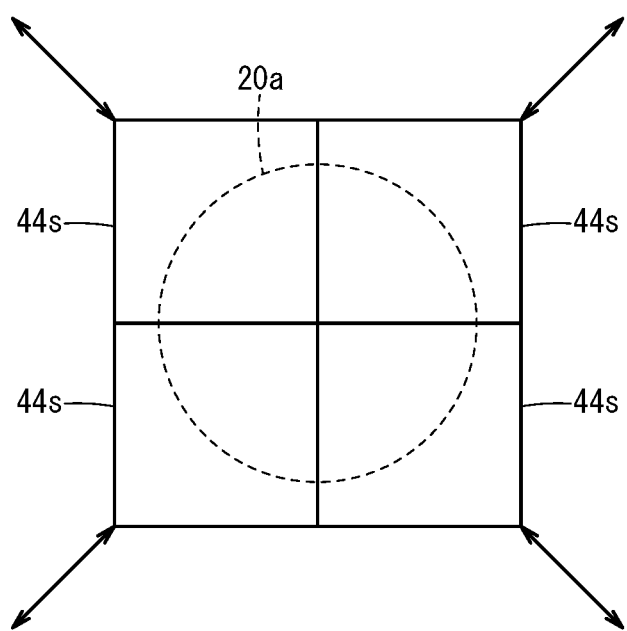
FIG. 7 is a diagram that illustrates a modification of a cover.

In the above embodiment, the camera 20 is provided to each seat 90. Alternatively, one camera that can capture an image of all the vehicle occupants may be provided. In this case, the camera 20 needs to be provided with a plurality of covers 44. For example, as illustrated in FIG. 7, split covers 44s are provided ahead of the lens 20a in order not to capture the image of the vehicle occupant who does not desire the image capturing. A driving mechanism is individually provided to the split cover 44s. Each split cover 44s can individually operate. In an example in FIG. 7, each split cover 44s can move in a center direction and a radial direction of the lens 20a. The position and the movement direction of the split cover 44s are not limited to the example in FIG. 7, and are set in advance on the basis of the position of the vehicle occupant in the vehicle in the image that is acquired by the camera 20.

[1.3.2. Second Modification]

The image capturing permitted state and the image capturing limited state may be switched by turning ON/OFF a power source of the camera 20 instead of switching the exposure and the shading of the lens 20a by moving the cover 44.

[1.3.3. Third Modification]

In the above embodiment, the image capturing state is changed with hardware in which the cover device 40 is used. Alternatively, the image capturing state can be changed by software.

For example, the image capturing recording unit 54 records a coordinate of the position of each seat 90 in the image in advance. The state change unit 58 determines the image capturing state for each seat 90 (vehicle occupant) on the basis of the image capturing state information 62, reads out the coordinate of the seat 90 (vehicle occupant) in the image capturing limited state in the image from the image capturing recording unit 54, and trims the image information of the periphery of the seat 90 (vehicle occupant) in the image capturing limited state from the image information. Thus, in the image capturing limited state, the image information of the vehicle occupant is acquired by the camera 20; however, this image information is trimmed and is not stored in the image capturing recording unit 54.

[1.3.4. Fourth Modification]

In the above embodiment, in the process in step S3 in FIG. 5, just after the vehicle occupant gets on the vehicle, the image capturing state for all the vehicle occupants is the image capturing limited state. Alternatively, just after the vehicle occupant gets on the vehicle, the image capturing state for the driver may be the image capturing permitted state. In addition, the image capturing state for other vehicle occupants may be the image capturing permitted state.

2. Second Embodiment

The vehicle system according to the first embodiment can be used in other situations. An application example of the first embodiment is hereinafter described as a second embodiment. Note that in the description below, a configuration that is the same as that in the first embodiment is denoted by the same reference symbol, and the description thereof is omitted.

[2.1. Configuration of Vehicle System 10]

Figure 8:
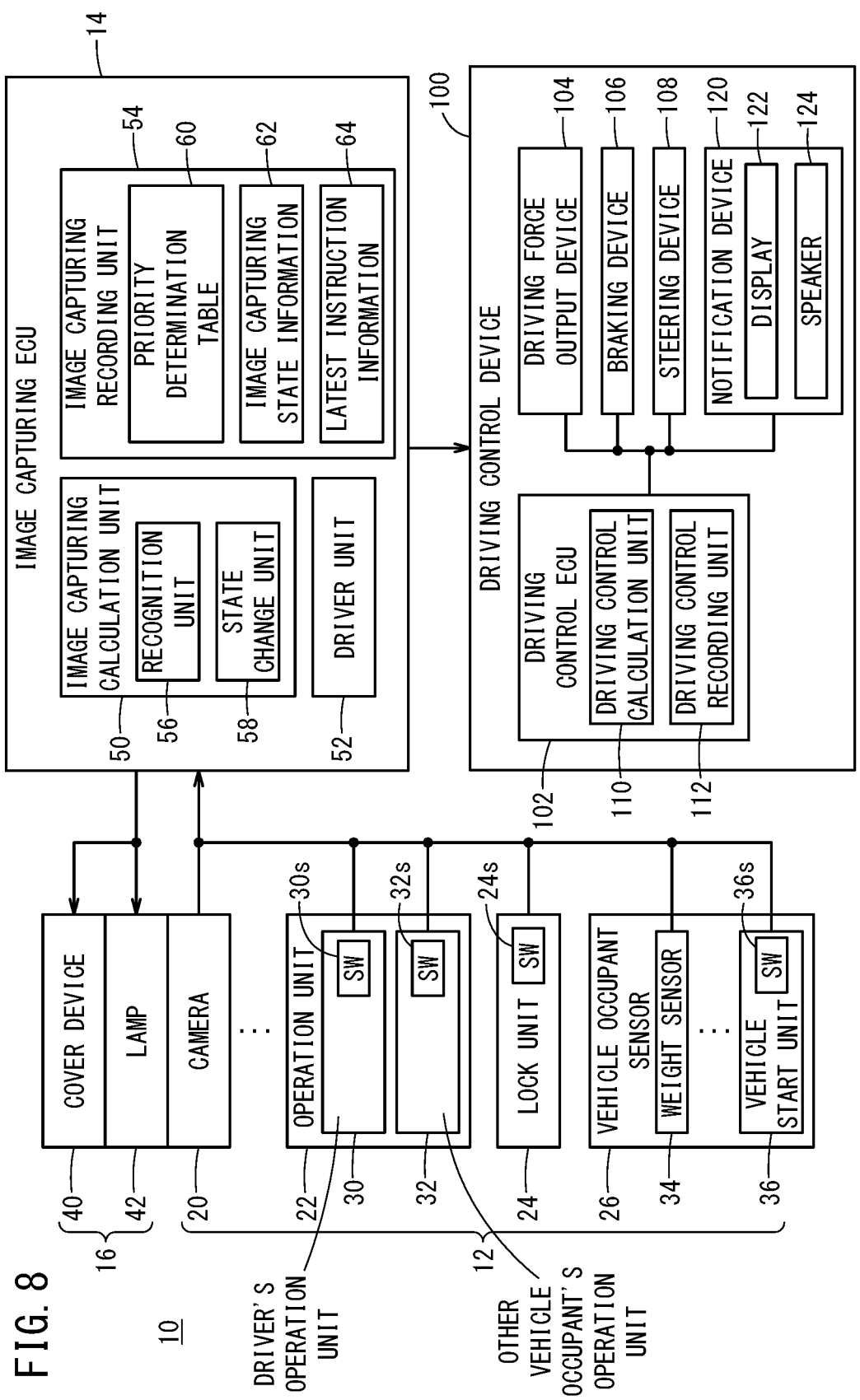
FIG. 8 is a configuration diagram of a vehicle system according to a second embodiment.

A configuration of the vehicle system 10 according to the second embodiment is described with reference to FIG. 8. The vehicle system 10 according to the second embodiment includes, in addition to each configuration in the first embodiment, a driving control device 100. The vehicle system 10 according to the second embodiment includes an automated driving function that performs at least a part of driving control of the vehicle.

The driving control device 100 includes a driving control ECU 102, a driving force output device 104, a braking device 106, a steering device 108, and a notification device 120.

The driving control ECU 102 is an electronic control unit (ECU) that includes a driving control calculation unit 110, a driving control recording unit 112, an input/output interface (not shown), and the like.

The driving control calculation unit 110 includes a processor such as a CPU, and achieves various functions when the processor executes programs recorded in the driving control recording unit 112. In order to control the automated driving, the driving control calculation unit 110 calculates an acceleration/deceleration instruction value and a steering instruction value on the basis of each piece of information that is output from various sensors, a navigation device, a communication device, and the like that are not shown.

Then, the driving control calculation unit 110 outputs these values to the driving force output device 104, the braking device 106, and the steering device 108. Moreover, the driving control calculation unit 110 outputs a notification instruction to the notification device 120 in order to notify the driver of information regarding driving assistance. The driving control recording unit 112 includes a memory such as a ROM and a RAM.

The driving force output device 104 includes a driving force output ECU and a driving source such as an engine or a traction motor. The driving force output device 104 generates driving force in accordance with a vehicle occupant's operation of an accelerator pedal or the accelerator instruction value that is output from the driving control ECU 102. The steering device 108 includes an electric power steering system (EPS) ECU and an EPS actuator. The steering device 108 generates steering force in accordance with a vehicle occupant's operation of a steering wheel or the steering instruction value that is output from the driving control ECU 102. The braking device 106 includes a brake ECU and a brake actuator. The braking device 106 generates braking force in accordance with a vehicle occupant's operation of a brake pedal or the deceleration instruction value that is output from the driving control ECU 102.

The notification device 120 includes a notification ECU, a display 122, and a speaker 124. The notification device 120 operates the display 122 and the speaker 124 in accordance with the notification instruction that is output from an external device, here, the driving control ECU 102. The display 122 is provided at a position that the driver can see, for example, on the dashboard.

[2.2. Operation of the Vehicle System 10]

If the driving control device 100 performs the automated driving control, it may be necessary to acquire the image information of the vehicle occupant, in particular, the driver. In other words, if the image information of the vehicle occupant, in particular, the driver cannot be acquired, the driving control device 100 may need to avoid the automated driving control. From this viewpoint, in the second embodiment, the automated driving control by the driving control device 100 is limited in accordance with the image capturing state.

Figure 6:
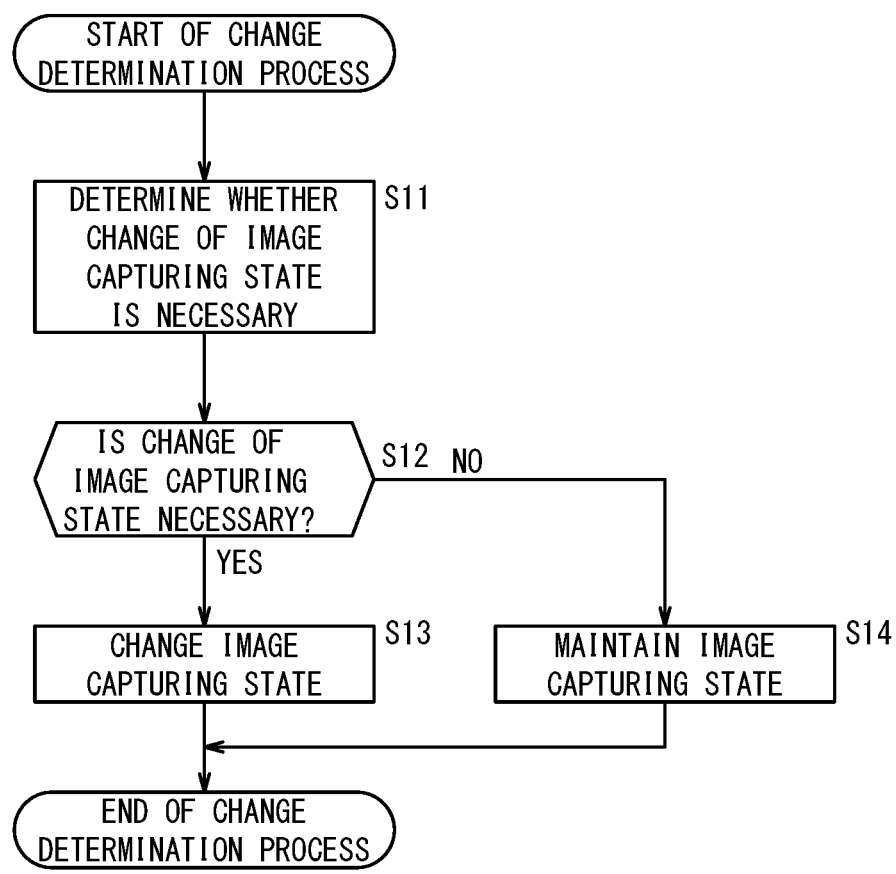
FIG. 6 is a flowchart of a change determination process.

In the process of step S13 in FIG. 6, when image capturing state is changed from the image capturing permitted state to the image capturing limited state, the state change unit 58 outputs to the driving control ECU 102, a forbiddance instruction that instructs to forbid the automated driving.

The driving control ECU 102 forbids the automated driving control in accordance with the forbiddance instruction, and does not perform the automated driving even if an operation switch (not shown) of the automated driving is operated. If the forbiddance instruction is input from the image capturing ECU 14 in the automated driving control, the driving control ECU 102 outputs to the notification device 120, the notification instruction that instructs to notify that the automated driving control is stopped. At this time, a message in accordance with the notification instruction is displayed in the display 122, and the message in accordance with the notification instruction is output from the speaker 124. If the driver does not take over the driving within a predetermined time after the message is output from the display 122 and the speaker 124, the driving control ECU 102 outputs the stop instruction to the braking device 106 so as to stop the vehicle.

3. Third Embodiment

Similarly to the second embodiment, an application example of the first embodiment is hereinafter described as a third embodiment. Note that in the description below, a configuration that is the same as that in the first embodiment and the second embodiment is denoted by the same reference symbol, and the description thereof is omitted.

[3.1. Configuration of Vehicle System 10]

Figure 9:
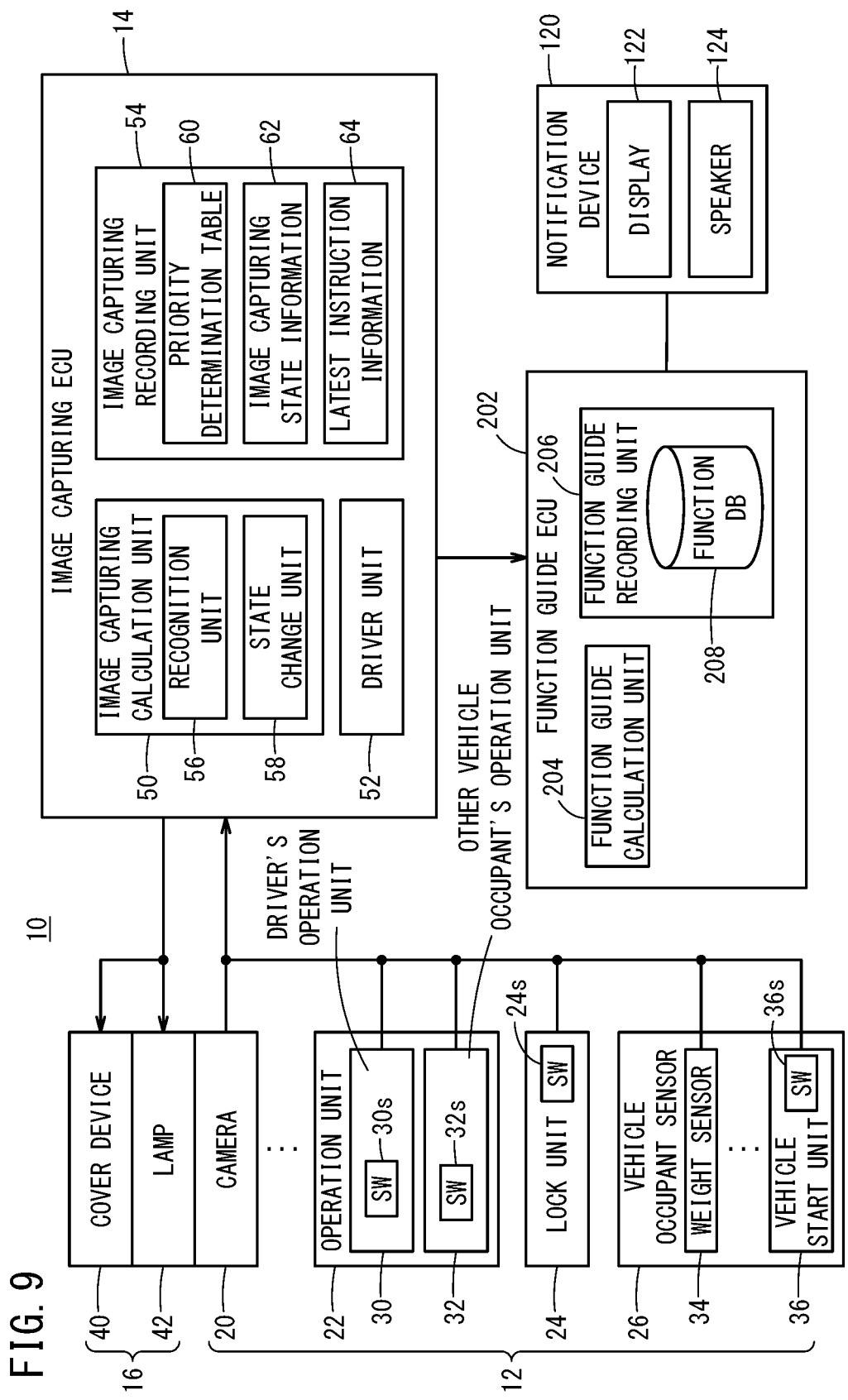
FIG. 9 is a configuration diagram of a vehicle system according to a third embodiment.

A configuration of the vehicle system 10 according to the third embodiment is described with reference to FIG. 9. The vehicle system 10 according to the third embodiment includes, in addition to each configuration in the first embodiment, a function guide ECU 202 and the notification device 120.

The function guide ECU 202 is an electronic control unit (ECU) that includes a function guide calculation unit 204, a function guide recording unit 206, an input/output interface (not shown), and the like.

The function guide calculation unit 204 includes a processor such as a CPU, and achieves various functions when the processor executes programs recorded in the function guide recording unit 206. In order to show the vehicle occupant a function that can be performed by the vehicle, the function guide calculation unit 204 outputs guide information to the notification device 120.

The function guide recording unit 206 includes a memory such as a ROM and a RAM. The function guide recording unit 206 stores a function database 208 (hereinafter, referred to as function DB 208) in advance. As shown in FIG. 10, the function DB 208 associates function information 210 (function name, function content) regarding a function that the vehicle has (service that the vehicle can provide), with condition information 212 regarding a condition that is necessary when the function is performed, and records the function information 210 and the condition information 212. The condition information 212 includes information about a condition regarding the image capturing state, specifically, information as to whether the function is a function that can be performed when the image capturing state is the image capturing permitted state (hereinafter, referred to as first function), a function that can be performed even when the image capturing state is the image capturing limited state (hereinafter, referred to as second function), or a function that can be performed when the image capturing state for all the vehicle occupants is the image capturing permitted state (hereinafter, referred to as third function), for example.

For example, each function is as follows. The first function is a function that requires the image information of the vehicle occupant's face, for example, a function that requires personal authentication, a vehicle occupant's state estimation function (estimating line of sight, estimating face direction, estimating doze, or the like), a vehicle occupant's emotion estimation function, or the like. The second function is a function that does not require the image information of the vehicle occupant's face, that is, a function of an ordinary vehicle. The third function is a function that requires the image information of all of the vehicle occupants' faces, for example, a recommendation information providing function on the basis of the emotion or a topic of all the vehicle occupants.

The notification device 120 is provided to each seat 90. In the third embodiment, the display 122 is provided at a position that the vehicle occupant who is seated on the seat 90 can see. A position that the vehicle occupants who are seated on the driver's seat 90a and the passenger seat can see is the dashboard, the ceiling, or the like. A position that the vehicle occupant who is seated on the rear seat can see is the seat back of the seat 90 ahead of the rear seat, the ceiling, or the like.

[3.2. Operation of Vehicle System 10]

The state change unit 58 of the image capturing ECU 14 outputs to the function guide ECU 202, the image capturing state information 62 that is stored in the image capturing recording unit 54. The function guide calculation unit 204 decides the content to be displayed in the display 122 that is provided to each seat 90 on the basis of the input image capturing state information 62 and the function DB 208.

For example, if the image capturing state for at least one vehicle occupant is the image capturing limited state, the function guide calculation unit 204 outputs to the notification device 120, the notification instruction that shows the third function. At this time, all the displays 122 display the guide to the third function.

For example, if the image capturing state for the driver who is seated on the driver's seat 90*a* is the image capturing limited state, the function guide calculation unit 204 outputs to the notification device 120, the notification instruction that shows the first function. At this time, the display 122 corresponding to the driver's seat 90*a* displays the guide to the first function. Note that the function guide calculation unit 204 may output, in addition to the notification instruction that shows the first function, the notification instruction that shows the second function to the notification device 120. At this time, the display 122 corresponding to the driver's seat 90*a* displays the guide to the first function and the guide to the second function. Similarly, the display 122 corresponding to the other seat 90*b* displays the guide to each function.

The function guide calculation unit 204 can output the notification instruction to the notification device 120 at any timing. For example, the function guide calculation unit 204 can output the notification instruction that shows the first function at the same time as or within a predetermined time after the process in step S3 in FIG. 5.

In the above embodiments, the vehicle that includes the driver's seat 90*a* is assumed. Incidentally, in recent years, development of a fully automated driving vehicle has been anticipated increasingly, in which the driving is mainly performed by the driving system of the vehicle. The present invention can apply to such a fully automated driving vehicle.

4. Invention Obtained by Embodiments

The invention that can be understood by the above embodiments and the modifications is described below.

The present invention is the vehicle system 10 that captures the image of the vehicle occupant in the vehicle, and the vehicle system 10 includes: the camera 20 configured to capture the image of the vehicle occupant; and the state change unit 58 configured to change the image capturing state for the vehicle occupant by the camera 20 to each of the image capturing permitted state where the image of the vehicle occupant is permitted to be captured and the image capturing limited state where capturing of the image of the vehicle occupant is limited, wherein the state change unit 58 is configured to change the image capturing state for each of the plurality of vehicle occupants.

By the above configuration, the image capturing state by the camera 20 can be changed for each vehicle occupant. Thus, the will of each vehicle occupant regarding whether to have his/her image captured can be reflected.

In the present invention, the state change unit 58 may be configured to keep the image capturing state for each vehicle occupant as the image capturing limited state until the state change unit 58 is operated after the vehicle occupant gets on the vehicle.

By the above configuration, unless the vehicle occupant who has gotten on the vehicle changes the image capturing state to the image capturing permitted state by his/her will, the image capturing limited state is maintained. Thus, undesirable image capturing of the vehicle occupant against his/her will, can be prevented.

In the present invention, the vehicle may include the seats 90 including the driver's seat 90*a*.

The vehicle includes the vehicle in which the driving is mainly performed by the driving system of the vehicle and the vehicle in which the driving is mainly performed by the driver. By the above configuration, in the vehicle in which the driving is mainly performed by the driver, the will of each vehicle occupant regarding whether to have his/her image captured, can be reflected.

In the present invention, the state change unit 58 may be configured to keep the image capturing state for each vehicle occupant who is seated on the seat other than the driver's seat 90*a* (other seat 90*b*) as the image capturing limited state until the state change unit 58 is operated after the vehicle occupant gets on the vehicle.

By the above configuration, unless the vehicle occupant other than the driver who has gotten on the vehicle changes the image capturing state to the image capturing permitted state by his/her will, the image capturing limited state is maintained. Thus, undesirable image capturing of the non-driver vehicle occupant against his/her will, can be prevented.

The vehicle system 10 according to the present invention may further include the driver's operation unit 30 that is provided at the position corresponding to the driver's seat 90*a* and is configured to change the image capturing state for each vehicle occupant.

By the above configuration, the image capturing state for the vehicle occupant other than the driver can be operated. For example, the parent as the driver can change the image capturing state for the child who is seated on the other seat 90*b*.

The vehicle system 10 according to the present invention may further include the operation unit 22 that is provided at the position corresponding to each seat 90 and is configured to change the image capturing state for the vehicle occupant who is seated on the corresponding seat 90.

By the above configuration, the vehicle occupant who is seated on each seat can easily change the image capturing state for himself.

The vehicle system 10 according to the present invention may further include: the first operation unit (other vehicle occupant's operation unit 32) that is provided at the position corresponding to each seat 90 (other seat 90*b*) and is configured to change the image capturing state for the vehicle occupant who is seated on the corresponding seat 90 (other seat 90*b*); and the second operation unit (driver's operation unit 30) that is provided at the position corresponding to at least one seat 90 and is configured to change the image capturing state for the vehicle occupant who is seated on the seat 90 (other seat 90*b*) other than the corresponding seat 90 (driver's seat 90*a*), wherein the state change unit 58 may be configured to change the image capturing state so that the operation performed in the second operation unit is prioritized over the operation performed in the first operation unit.

By the above configuration, with respect to the image capturing state for the vehicle occupant who is seated on one seat 90, if the change operation for the image capturing state is performed by the vehicle occupant who is seated on the one seat 90, this change operation is prioritized. Thus, the will of each vehicle occupant can be reflected for sure, regarding whether to have his/her image captured.

In the present invention, the second operation unit may be the driver's operation unit 30 that is provided at the position corresponding the driver's seat 90*a* and is configured to change the image capturing state for each vehicle occupant other than the driver, and the state change unit 58 may be configured to change the image capturing state so that the operation performed in the first operation unit (other vehicle occupant's operation unit 32) is prioritized over the operation performed in the driver's operation unit 30.

By the above configuration, with respect to the image capturing state for the vehicle occupant who is seated on one seat 90, if the change operation for the image capturing state is performed by the vehicle occupant who is seated on the one seat 90, this change operation is prioritized. Thus, the will of each vehicle occupant can be reflected for sure, regarding whether to have his/her image captured.

The vehicle system 10 according to the present invention may further include the sensor configured to detect the property of the vehicle occupant who is seated on the seat 90, wherein if the vehicle occupant satisfies the predetermined property, the state change unit 58 may be configured to change the image capturing state for the vehicle occupant who satisfies the predetermined property so that the operation performed in the driver's operation unit 30 is prioritized over the operation performed in the first operation unit (other vehicle occupant's operation unit 32).

The vehicle system 10 according to the present invention may further include the weight sensor 34 configured to measure the weight of the vehicle occupant, wherein the predetermined property may be that the weight of the vehicle occupant is less than or equal to the predetermined value.

By the above configuration, if the vehicle occupant who is seated on the other seat 90*b* is the child, it is possible to prevent the child from operating the other vehicle occupant's operation unit 32.

The vehicle system 10 according to the present invention may further include the lock unit 24 that is provided at the position corresponding to the driver's seat 90*a* and is configured to output the lock signal in accordance with the operation, wherein if the lock signal is received, the state change unit 58 may be configured to forbid the change of the image capturing state for each vehicle occupant to the image capturing permitted state.

By the above configuration, the driver can lock the image capturing state for the other vehicle occupant. Thus, it is possible to prevent the other vehicle occupant from changing the image capturing state to the image capturing permitted state mistakenly.

The vehicle system 10 according to the present invention may further include the driving control device 100 configured to perform the automated driving control that performs at least a part of the driving operation of the vehicle, wherein if the image capturing state for the vehicle occupant who is seated on the driver's seat 90*a* is the image capturing limited state, the driving control device 100 may be configured not to perform the automated driving control.

If the automated driving control is performed, it may be necessary to acquire the image information of the vehicle occupant, in particular, the driver. By the above configuration, if the image information of the vehicle occupant is not acquired, the automated driving control is not performed. Thus, the necessary requirement for the automated driving control can be satisfied.

The vehicle system 10 according to the present invention may further include: the recording unit (function guide recording unit 206) configured to associate the function that is adapted to be performed in the vehicle with the image capturing state, and record the function and the image capturing state in advance; and the notification device 120 configured to output the information to the vehicle occupant, wherein if the image capturing state is the image capturing limited state, the notification device 120 may be configured to output the information about the function that is adapted to be performed in the case where the image capturing state is the image capturing permitted state.

By the above configuration, it is possible to prompt the vehicle occupant whose image capturing state is the image capturing limited state to change the image capturing state to the image capturing permitted state.

The vehicle system 10 according to the present invention may further include: the recording unit (function guide recording unit 206) configured to associate the function that is adapted to be performed in the vehicle with the image capturing state, and record the function and image capturing state in advance; and the notification device 120 configured to output the information to the vehicle occupant, wherein if the image capturing state for at least one vehicle occupant among the vehicle occupants is the image capturing limited state, the notification device 120 may be configured to output the information about the function that is adapted to be performed in the case where the image capturing state for all the vehicle occupants is the image capturing permitted state.

By the above configuration, it is possible to prompt the vehicle occupant whose image capturing state is the image capturing limited state to change the image capturing state to the image capturing permitted state.

The vehicle system 10 according to the present invention may further include: the recording unit (function guide recording unit 206) configured to associate the function that is adapted to be performed in the vehicle with the image capturing state, and record the function and the image capturing state in advance; and the notification device 120 configured to output the information to the vehicle occupant, wherein if the image capturing state is the image capturing limited state, the notification device 120 may be configured to output the information about the function that is adapted to be performed in the case where the image capturing state is the image capturing limited state and information about the function that is adapted to be performed in the case where the image capturing state is the image capturing permitted state.

By the above configuration, the vehicle occupant can select one of the image capturing permitted state and the image capturing limited state in accordance with his will.

In the present invention, the notification device 120 may include the display 122 that is provided to each seat 90.

Note that the vehicle system according to the present invention is not limited to the above embodiments, and can employ various configurations without departing from the gist of the present invention. In addition, the first embodiment to the third embodiment can be combined appropriately.

What is claimed is:

1. A vehicle system that captures an image of a vehicle occupant in a vehicle, the vehicle system comprising:
a camera configured to capture the image of the vehicle occupant;
a memory configured to store various information and computer-executable instructions; and
one or more processors that execute the computer-executable instructions stored in the memory,
wherein the one or more processors execute the computer-executable instructions to cause the vehicle system to:
change an image capturing state for the vehicle occupant by the camera to each of an image capturing permitted state where the image of the vehicle occupant is permitted to be captured and an image capturing limited state where capturing the image of the vehicle occupant is limited,
change the image capturing state for each of a plurality of the vehicle occupants, and
keep the image capturing state for each vehicle occupant who is seated on a seat other than a driver's seat as the image capturing limited state until change of the image capturing state is instructed after the vehicle occupants get on the vehicle.

2. The vehicle system according to claim 1, further comprising a driver's operation switch that is provided at a position corresponding to the driver's seat and is configured to change the image capturing state for each vehicle occupant.

3. The vehicle system according to claim 1, further comprising an operation switch that is provided at a position corresponding to each seat and is configured to change the image capturing state for the vehicle occupant who is seated on the corresponding seat.

4. The vehicle system according to claim 1, further comprising:
a first operation switch that is provided at a position corresponding to each seat and is configured to change the image capturing state for the vehicle occupant who is seated on the corresponding seat; and
a second operation switch that is provided at a position corresponding to at least one seat and is configured to change the image capturing state for the vehicle occupant who is seated on the seat other than the corresponding seat,
wherein the one or more processors cause the vehicle system to change the image capturing state so that an operation performed in the second operation switch is prioritized over an operation performed in the first operation switch.

5. The vehicle system according to claim 4, wherein:
the second operation switch is the driver's operation switch that is provided at a position corresponding the driver's seat and is configured to change the image capturing state for each vehicle occupant other than the driver; and
the one or more processors cause the vehicle system to change the image capturing state so that the operation performed in the first operation switch is prioritized over an operation performed in the driver's operation switch.

6. The vehicle system according to claim 5, further comprising a sensor configured to detect a property of the vehicle occupant who is seated on the seat,
wherein if the vehicle occupant satisfies a predetermined property, the one or more processors cause the vehicle system to change the image capturing state for the vehicle occupant who satisfies the predetermined property so that the operation performed in the driver's operation switch is prioritized over the operation performed in the first operation switch.

7. The vehicle system according to claim 6, further comprising a weight sensor configured to measure weight of the vehicle occupant,
wherein the predetermined property is that the weight of the vehicle occupant is less than or equal to a predetermined value.

8. The vehicle system according to claim 1, further comprising a lock unit that is provided at a position corresponding to the driver's seat and is configured to output a lock signal in accordance with an operation,
wherein if the lock signal is received, the one or more processors cause the vehicle system to forbid change of the image capturing state for each vehicle occupant to the image capturing permitted state.

9. The vehicle system according to claim 1, wherein the one or more processors cause the vehicle system to perform automated driving control that performs at least a part of a driving operation of the vehicle, and
if the image capturing state for the vehicle occupant who is seated on the driver's seat is the image capturing limited state, not to perform the automated driving control.

10. The vehicle system according to claim 1, further comprising either a display or a speaker configured to output information to the vehicle occupant,
wherein the various information stored in the memory includes a function that is adapted to be performed in the vehicle in association with the image capturing state in advance; and
wherein if the image capturing state is the image capturing limited state, either the display or the speaker is configured to output information about the function that is adapted to be performed in a case where the image capturing state is the image capturing permitted state.

11. The vehicle system according to claim 10, wherein the display is provided to each seat.

12. A vehicle system that captures an image of a vehicle occupant in a vehicle, the vehicle system comprising:
a camera configured to capture the image of the vehicle occupant;
a memory configured to store computer-executable instructions and a function that is adapted to be performed in the vehicle in association with an image capturing state for the vehicle occupant by the camera in advance;
either a display or a speaker configured to output information to the vehicle occupant; and
one or more processors that execute the computer-executable instructions stored in the memory,
wherein the one or more processors execute the computer-executable instructions to cause the vehicle system to:
change the image capturing state to each of an image capturing permitted state where the image of the vehicle occupant is permitted to be captured and an image capturing limited state where capturing the image of the vehicle occupant is limited, and
change the image capturing state for each of a plurality of the vehicle occupants,
wherein if the image capturing state for at least one vehicle occupant among the vehicle occupants is the image capturing limited state, either the display or the speaker outputs information about the function that is adapted to be performed in a case where the image capturing state for all the vehicle occupants is the image capturing permitted state.

13. A vehicle system that captures an image of a vehicle occupant in a vehicle, the vehicle system comprising:
   a camera configured to capture the image of the vehicle occupant;
   a memory configured to store computer-executable instructions and a function that is adapted to be performed in the vehicle in association with an image capturing state for the vehicle occupant by the camera in advance;
   either a display or a speaker configured to output information to the vehicle occupant; and
   one or more processors that execute the computer-executable instructions stored in the memory,
   wherein the one or more processors execute the computer-executable instructions to cause the vehicle system to:
   change the image capturing state to each of an image capturing permitted state where the image of the vehicle occupant is permitted to be captured and an image capturing limited state where capturing the image of the vehicle occupant is limited, and
   change the image capturing state for each of a plurality of the vehicle occupants,
   wherein if the image capturing state is the image capturing limited state, either the display or the speaker is configured to output information about the function that is adapted to be performed in a case where the image capturing state is the image capturing limited state and information about the function that is adapted to be performed in a case where the image capturing state is the image capturing permitted state.

* * * * *